United States Patent
Espagnan et al.

(10) Patent No.: US 8,210,472 B2
(45) Date of Patent: Jul. 3, 2012

(54) METHOD FOR IMPROVING THE PERFORMANCE OF AN AIRCRAFT

(75) Inventors: Lionel Espagnan, Toulouse (FR);
Arnaud Hormiere, Toulouse (FR);
Francois Guillaumel, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 395 days.

(21) Appl. No.: 12/582,385

(22) Filed: Oct. 20, 2009

(65) Prior Publication Data
US 2010/0102165 A1    Apr. 29, 2010

(30) Foreign Application Priority Data
Oct. 29, 2008  (FR) ...................................... 08 06010

(51) Int. Cl.
*B64C 1/00*    (2006.01)
(52) U.S. Cl. ............................ 244/36; 244/130; 244/119
(58) Field of Classification Search .................... 244/13, 244/15, 36, 130, 117 R, 119
See application file for complete search history.

(56) References Cited

U.S. PATENT DOCUMENTS

| | | | | |
|---|---|---|---|---|
| 2,601,962 A | * | 7/1952 | Douglas ........................... | 244/87 |
| 3,670,995 A | * | 6/1972 | Swearingen ..................... | 244/80 |
| 4,741,497 A | * | 5/1988 | Fox ................................. | 244/119 |
| 4,828,204 A | * | 5/1989 | Friebel ............................ | 244/15 |
| 5,769,358 A | * | 6/1998 | Hahl et al. ...................... | 244/36 |
| 6,227,498 B1 | * | 5/2001 | Arata .............................. | 244/130 |
| 6,817,571 B2 | * | 11/2004 | Retz et al. ...................... | 244/119 |
| 7,143,979 B2 | * | 12/2006 | Wood et al. .................... | 244/119 |
| 7,309,046 B2 | * | 12/2007 | Makino .......................... | 244/130 |
| 7,520,470 B2 | * | 4/2009 | Lucchesini et al. ............ | 244/199.1 |
| 2005/0116108 A1 | * | 6/2005 | Morgenstern et al. ......... | 244/130 |
| 2007/0170309 A1 | * | 7/2007 | Schafroth ....................... | 244/36 |

FOREIGN PATENT DOCUMENTS

EP    0 827 905    3/1998

OTHER PUBLICATIONS

Preliminary Search Report dated Jun. 17, 2009.

* cited by examiner

*Primary Examiner* — Christopher P Ellis
(74) *Attorney, Agent, or Firm* — Dickinson Wright PLLC

(57) ABSTRACT

Disclosed is a method for improving the performance of transport aircraft. In particular, the aircraft is provided with a rounded nose cone in front of a center of gravity of the aircraft. The rounded nose cone has an upper longitudinal surface and a lower longitudinal surface configured, respectively, to generate a lifting force and a negative lifting force and produce a resultant that is lifting and to produce an auxiliary nose-up moment. The method involves shaping the nose cone to increase the lifting resultant. This shaping is carried out by increasing the upper longitudinal surface of the nose cone, so as to increase the lifting force, and by reducing the lower longitudinal surface of the nose cone, so as to decrease the negative lifting force.

5 Claims, 1 Drawing Sheet

METHOD FOR IMPROVING THE PERFORMANCE OF AN AIRCRAFT

FIELD OF THE INVENTION

The present invention relates to a method for improving the performance of an aircraft, as well as to an aircraft implementing such a method.

BACKGROUND OF THE INVENTION

It is known that the airfoil of an aircraft, for example a civilian transport airplane, generates a lift, producing a nose-down moment for the airplane, and that, to counteract this nose-down moment, the horizontal tail plane of the aircraft generates a negative lift producing a balancing nose-up moment.

Furthermore, for an airplane having a fuselage provided with a nose cone, disposed in front of the center of gravity of the airplane, which terminates towards the front in a rounded nose, it is known that the upper longitudinal surface and the lower longitudinal surface of said nose cone generate respectively a lifting force and a negative lifting force, the resultant of which is lifting and produces an auxiliary nose-up moment.

Thus, the balancing nose-up moment and the auxiliary nose-up moment make it possible to offset the nose-down moment, thereby ensuring the pitch stability of the airplane.

However, the negative lift generated by the horizontal tail plane of the airplane is automatically accompanied by the appearance of an induced drag which is all the larger the greater the negative lift generated by the horizontal tail plane. This induced drag is undesirable since it is detrimental to the performance of the airplane.

Hence, to reduce the negative lift generated by the horizontal tail plane and therefore the associated undesirable induced drag, some aeronautical constructors have chosen to eliminate this tail plane entirely and to replace it with a lifting surface, of canard tail plane type, disposed at the front of the airplane between its nose and its center of gravity.

However, this canard lifting surface generates a lift which is also accompanied by a strong induced drag. Furthermore, this creates a wake and a deflection of the flow of the air stream on the airfoil of the airplane, thereby degrading its performance.

SUMMARY OF THE INVENTION

The object of the present invention is therefore to remedy these drawbacks and notably to reduce the undesirable drag generated by the horizontal tail plane of an aircraft, without installing additional lifting surfaces or hardware.

To this end, according to the invention, the method for improving the performance of an aircraft comprising:
 an airfoil generating a lift producing a nose-down moment for said aircraft;
 a horizontal tail plane generating a negative lift producing a balancing nose-up moment for said aircraft; and
 a fuselage provided with a nose cone, which is disposed in front of the center of gravity of said aircraft and which terminates towards the front in a rounded nose, the upper longitudinal surface and the lower longitudinal surface of said nose cone generating respectively a lifting force and a negative lifting force, the resultant of which is lifting and produces an auxiliary nose-up moment,
is noteworthy in that said nose cone is altered so as to increase said lifting resultant.

Thus, by virtue of the invention, by increasing the lifting resultant associated with the nose cone, the auxiliary nose-up moment that it generates is increased without further hardware or additional lifting surfaces. The negative lift of the horizontal tail plane, necessary to ensure the pitch stability of the aircraft, can then be reduced, thus consequently making it possible to obtain a reduction in the induced drag which accompanies it.

Preferably, to increase said lifting resultant, it is advantageously possible to increase said lifting force:
 by increasing said upper longitudinal surface of said nose cone; and/or
 by optimizing the curvature of said upper longitudinal surface, so as to increase the flow speed of the air stream on the latter surface. Thus, the suction in the vicinity of the upper longitudinal surface is increased.

As a variant or supplement, to increase said lifting resultant, it is advantageously possible to decrease said negative lifting force:
 by reducing said lower longitudinal surface of said nose cone; and/or
 by optimizing the curvature of said lower longitudinal surface, so as to reduce the flow speed of the air stream on the latter surface. Thus, the suction in the vicinity of the lower longitudinal surface is reduced.

Furthermore, to increase said lifting resultant, it is advantageously possible to displace said nose of said nose cone vertically upwards.

The present invention also relates to an aircraft implementing the method such as mentioned above.

BRIEF DESCRIPTION OF THE DRAWINGS

The figures of the appended drawing will elucidate the manner in which the invention may be embodied. In these figures, identical references designate similar elements.

DETAILED DESCRIPTION OF THE INVENTION

Figure 1:
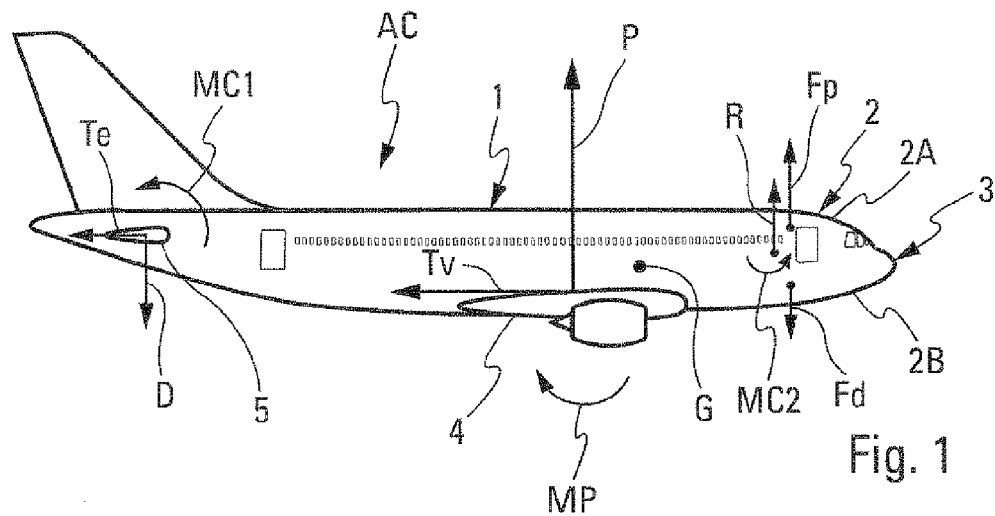
FIG. 1 is a schematic profile view of an airplane.

The aircraft AC, shown in FIG. 1, is a civilian transport airplane, which comprises in a standard manner:
 a fuselage 1 with annular cross-section provided with a nose cone 2 disposed in front of the center of gravity G of the airplane AC. This nose cone 2 terminates towards the front in a rounded nose 3;
 an airfoil 4 generating a lift (symbolized by the arrow P) producing a nose-down moment (symbolized by the semi-circular arrow MP) for the airplane AC. The lift P is accompanied by a drag symbolized by the arrow Tv; and
 a horizontal tail plane 5 (fixed or inclinable) generating a negative lift (symbolized by the arrow D) which produces a balancing nose-up moment (symbolized by the semi-circular arrow MC1) for the airplane AC. The negative lift D is accompanied by a drag (symbolized by the arrow Te) which is all the bigger the greater the negative lift D.

Furthermore, as shown by FIG. 1, the upper longitudinal surface 2A and the lower longitudinal surface 2B of the nose cone 2 generate, in a standard manner, respectively a lifting force and a negative lifting force (symbolized respectively by the arrows Fp and Fd). The resultant (symbolized by the arrow R) of the lifting force Fp and of the negative lifting force Fd is lifting. It produces an auxiliary nose-up moment (symbolized by the arrow MC2).

Thus, the balancing nose-up moment MC1 and the auxiliary nose-up moment MC2 make it possible to compensate the nose-down moment MP, thereby ensuring the pitch stability of the airplane AC.

The lifting force Fp and the negative lifting force Fd can be determined on the basis of the following mathematical formula:

$$F = -Cp \times S \times Qdyn$$

in which:

F is the aerodynamic force (Fp or Fd);

S is the longitudinal surface area (upper 2A or lower 2B) of the nose cone 2;

$$Qdyn = \frac{1}{2} \times \rho \times V_\infty^2$$

is the dynamic pressure, $V_\infty$ being the speed of the air at infinity and $\rho$ the density of the air; and Cp is a pressure coefficient dependent on the curvature of the surface.

According to the invention, to reduce the negative lift D (generated by the horizontal tail plane 5) and thus decrease the drag Te, the shape of the nose cone 2 is altered so as to increase the lifting resultant R (for example by increasing the lifting force Fp and by decreasing the negative lifting force Fd) and the auxiliary nose-up moment MC2.

Figure 2:
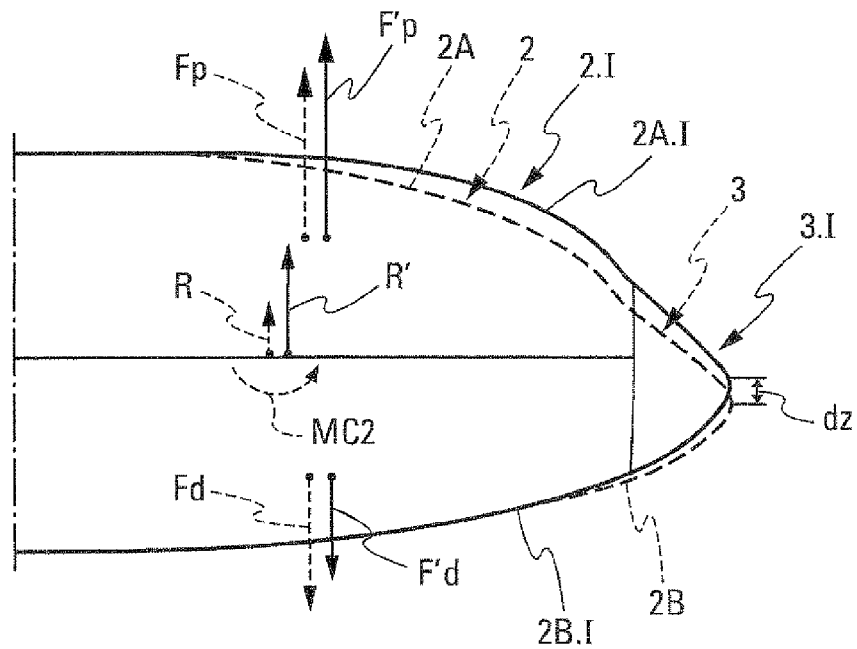
FIG. 2 illustrates, in a magnified profile view, an exemplary embodiment of an airplane nose cone in accordance with the invention (solid line), as well as a standard nose cone (dashed line).

As shown by FIG. 2 (in which the elements corresponding to the nose cone 2.I in accordance with the invention bear respectively the same reference as those corresponding to the standard nose cone 2, but assigned the index I), to increase the lifting force Fp, the upper longitudinal surface 2A.I of the nose cone 2.I in accordance with the invention has been increased (for example by 10%) with respect to the surface 2A of the standard nose cone 2. Moreover, to decrease the negative lifting force Fd, the lower longitudinal surface 2B.I of the nose cone 2.I has been reduced (for example by 7%) with respect to that 2B of the nose cone 2.

Furthermore, in accordance with the invention, the radii of curvature of the upper longitudinal surface 2A.I and of the lower longitudinal surface 2B.I of the nose cone 2.I have also been optimized so as, on the one hand, to increase the flow speed of the air stream on the upper surface 2A.I and, on the other hand, to reduce the flow speed of this stream on the lower surface 2B.I. Doing this increases the suction in the vicinity of the upper longitudinal surface 2A.I (that is to say the coefficient –Cp of the aforesaid formula is increased) and reduces the suction in the vicinity of the lower longitudinal surface 2B.I (that is to say the coefficient –Cp is decreased).

Figure 3:
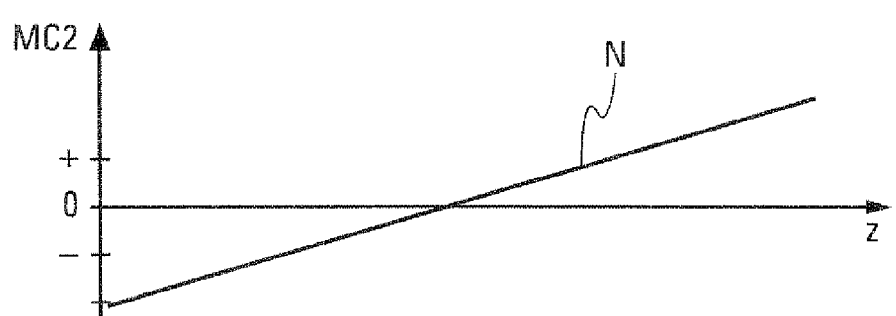
FIG. 3 is a diagram representing the evolution of the nose-up moment of the nose cone in accordance with the invention (FIG. 2) as a function of an upward vertical displacement of the nose of the airplane.

Moreover, as shown by the straight line N of the diagram of FIG. 3, the bigger the upward vertical displacement of the nose 3.I of the airplane AC with respect to a vertical reference position (position Z=O in FIG. 3), the greater the auxiliary nose-up moment MC2 of the airplane AC.

Hence, according to the invention, as shown by FIG. 2, the vertical position of the nose 3.I has been raised by dz (while complying with the design constraints such as the position of the nose gear, the location of the cockpit windows, etc.), so as to increase the lift generated by the front part of the nose cone 2.I.

It should be noted that the optimization of the radii of curvature of the upper longitudinal surface 2A.I and of the lower longitudinal surface 2B.I and/or the optimization of the vertical position of the nose 3.I amount to optimizing the distribution of the volumes of the nose cone 2.I of the airplane AC.

Thus, all these optimizations (surface, curvature, position of the nose) make it possible to increase the lifting resultant R' (of the lifting force F'p and of the negative lifting force F'd) associated with the nose cone 2.I with respect to the resultant R of the standard nose cone 2. The auxiliary nose-up moment MC2 is thus increased. It is then possible to reduce the negative lift D generated by the horizontal tail plane 5 and necessary to ensure the pitch stability of the airplane AC. Consequently, by reducing the negative lift D, the undesirable drag Te which accompanies it is decreased.

The invention claimed is:

1. A method for improving the performance of transport aircraft, said transport aircraft comprising:
    an airfoil configured to generate a lift producing a nose-down moment for said aircraft;
    a horizontal tail plane configured to generate a negative lift producing a balancing nose-up moment for said aircraft; and
    a fuselage with annular cross section and provided with a nose cone, wherein the nose cone is disposed in front of a center of gravity of said aircraft, terminates towards a front end in a rounded nose, and has an upper longitudinal surface and a lower longitudinal surface configured, respectively, to generate a lifting force and a negative lifting force and produce a resultant which is lifting and produce an auxiliary nose-up moment,
    wherein, the method comprises the steps of:
    shaping the nose cone to increase said lifting resultant:
    by increasing said upper longitudinal surface of said nose cone, so as to increase said lifting force;
    and by reducing said lower longitudinal surface of said nose cone, so as to decrease said negative lifting force.

2. The method as claimed in claim 1,
    wherein, to increase said lifting force, the curvature of said upper longitudinal surface is optimized so as to increase the flow speed of the air stream on the latter surface.

3. The method as claimed in claim 1,
    wherein, to decrease said negative lifting force, the curvature of said lower longitudinal surface is optimized so as to reduce the flow speed of the air stream on the latter surface.

4. The method as claimed in claim 1,
    wherein, to increase said lifting resultant, said nose of said nose cone is displaced vertically upwards.

5. An aircraft,
    wherein the method of claim 1 is implemented.

* * * * *